US008595053B1

(12) United States Patent
Klayman

(10) Patent No.: US 8,595,053 B1
(45) Date of Patent: Nov. 26, 2013

(54) CAMPAIGNING SYSTEMS AND METHODS

(75) Inventor: Gregg Klayman, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 155 days.

(21) Appl. No.: 13/168,362

(22) Filed: Jun. 24, 2011

Related U.S. Application Data

(60) Provisional application No. 61/358,831, filed on Jun. 25, 2010.

(51) Int. Cl.
*G06F 11/00* (2006.01)

(52) U.S. Cl.
USPC ............................................ 705/12; 235/386

(58) Field of Classification Search
USPC ............................................................ 705/12
See application file for complete search history.

(56) References Cited

U.S. PATENT DOCUMENTS

2007/0121843 A1* 5/2007 Atazky et al. ............ 379/114.13
2010/0145774 A1* 6/2010 Veshnyakov et al. ........... 705/12

FOREIGN PATENT DOCUMENTS

KR 2003056259 A * 7/2003

* cited by examiner

*Primary Examiner* — James A Reagan
(74) *Attorney, Agent, or Firm* — Foley & Lardner LLP

(57) ABSTRACT

A campaigning method may include collecting simulated vote totals of candidates in simulated campaigns for a plurality of users; tracking, by a server, performances of the campaigns of each of the users; maintaining a database in the server for the campaigns, each campaign associated with data; receiving a request for a screen from a requesting user of the users; generating the screen based on the database for display on a computer of the user to display the data for the campaign of the user and to provide a link associated with the user that allows voters to vote for the candidate associated with the campaign of the user; providing an interface associated with the link that enables the voters to submit a vote for the candidate to update the data in the database; and generating a status screen based on the updated data for display on a computer.

18 Claims, 8 Drawing Sheets

110

CAMPAIGNING SYSTEMS AND METHODS

CROSS-REFERENCE TO RELATED PATENT APPLICATIONS

This application claims priority from U.S. Provisional Patent Application 61/358,831, filed Jun. 25, 2010, incorporated herein by reference in its entirety.

BACKGROUND

Field

Embodiments of the present invention generally relate to campaigning systems and methods, and, in specific embodiments, to simulated campaigning systems and methods for collecting votes for one or more candidates.

DETAILED DESCRIPTION

Figure 1:
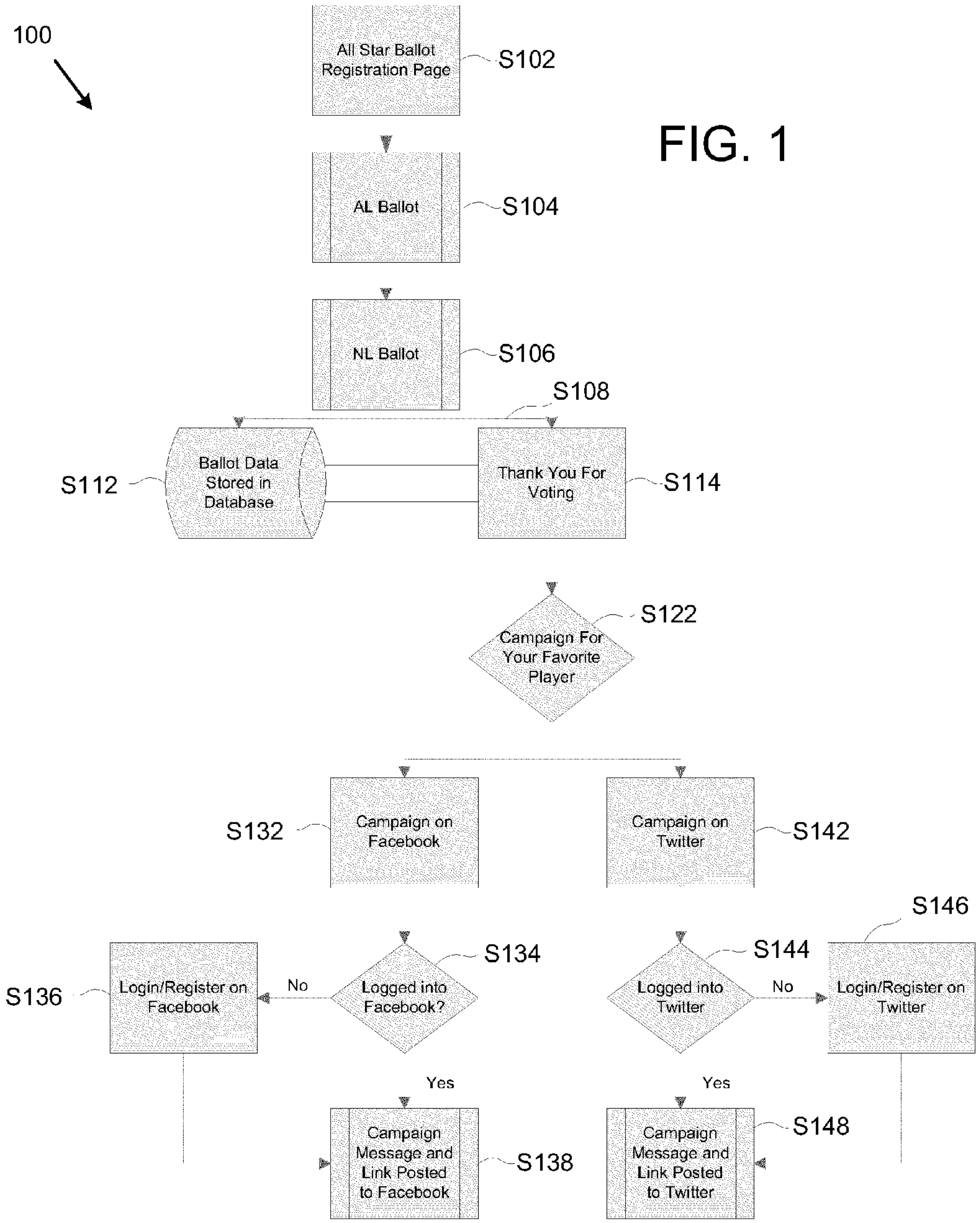
FIG. 1 is a flowchart illustrating a voting and campaigning process according to an embodiment of the present invention.

Various embodiments include program products comprising computer-readable media for carrying or having computer-executable instructions or data structures stored thereon. Such computer-readable media can be any available media that can be accessed by a general purpose or special purpose computer or server (e.g., 1010 in FIG. 7). By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data that cause a general-purpose computer, special purpose computer, or special purpose processing device to perform a certain function or group of functions.

In addition to a system, various embodiments are described in the general context of methods and/or processes, which may be implemented in one embodiment by a program product including computer-executable instructions, such as program code, executed by computers in networked environments. It should be noted that the terms "method" and "process" may be synonymous unless otherwise noted. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers (e.g., 1010 in FIG. 7) having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations (e.g., user computers 1020*a*, 1020*b*, . . . , 1020*n* interacting with remote server 1010 in FIG. 7), including personal computers hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. In various embodiments, data may be stored either in repositories and synchronized with a central warehouse optimized for queries and/or for reporting, or stored centrally in a database (e.g., dual use database) and/or the like.

An exemplary system for implementing the overall system or portions of the invention might include a general-purpose computing device in the form of a conventional computer, including a processing unit, a system memory, and a system bus that couples various system components including the system memory to the processing unit. The system memory may include read only memory (ROM) and random access memory (RAM). The computer may also include a storage medium, such as a solid state storage device and/or a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules, and other data for the computer.

Software and Web implementations of the present invention could be accomplished with standard programming techniques with rule-based logic and other logic to accomplish the various database searching steps, correlation steps, comparison steps and decision steps. It should also be noted that the words "component" or "module" as used herein is intended to encompass implementations using one or more lines of software code, and/or hardware implementations, and/or equipment for receiving manual inputs.

Figure 2:
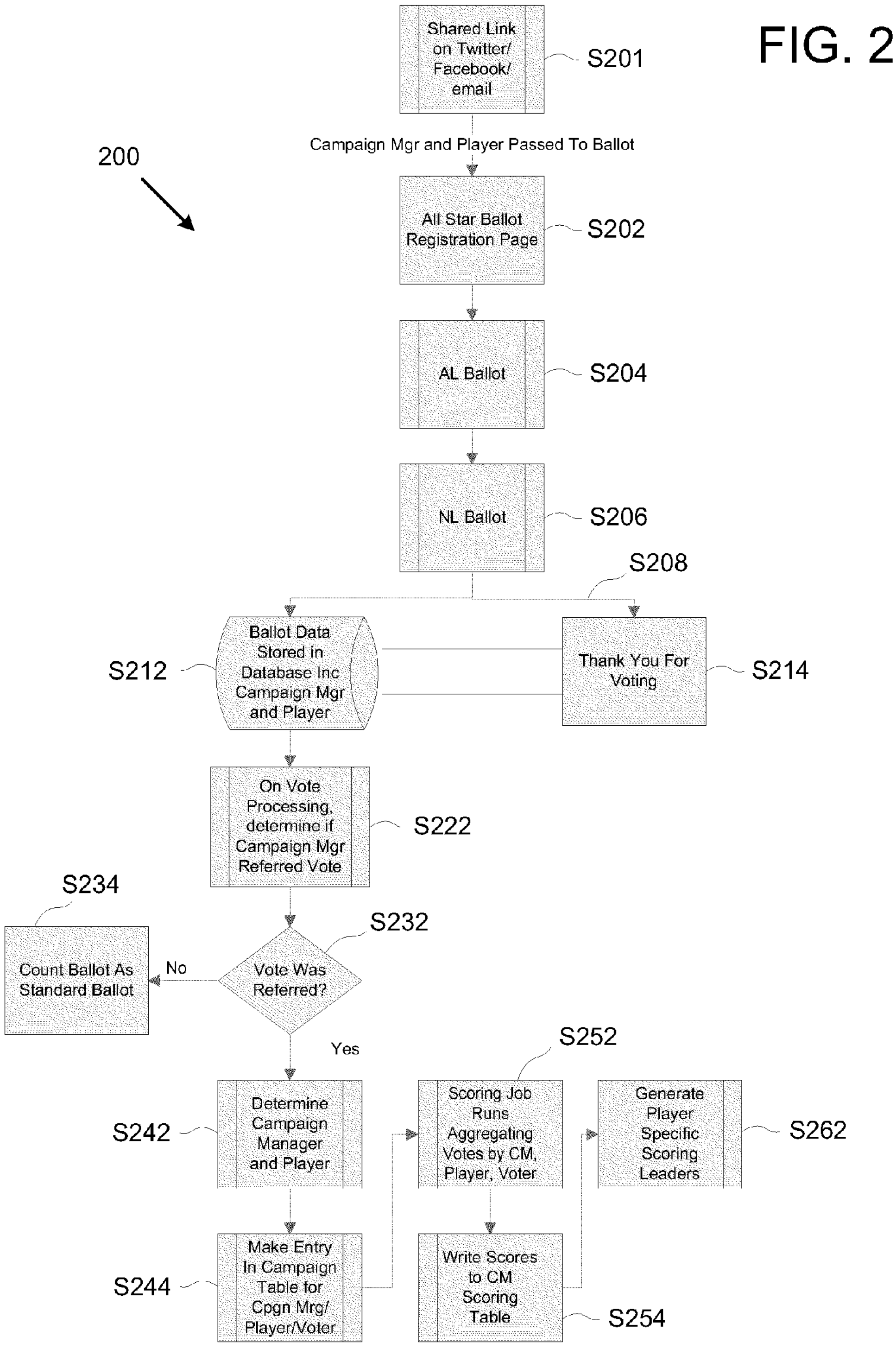
FIG. 2 is a flowchart illustrating a campaign referring and scoring process according to an embodiment of the present invention.
Figure 3:
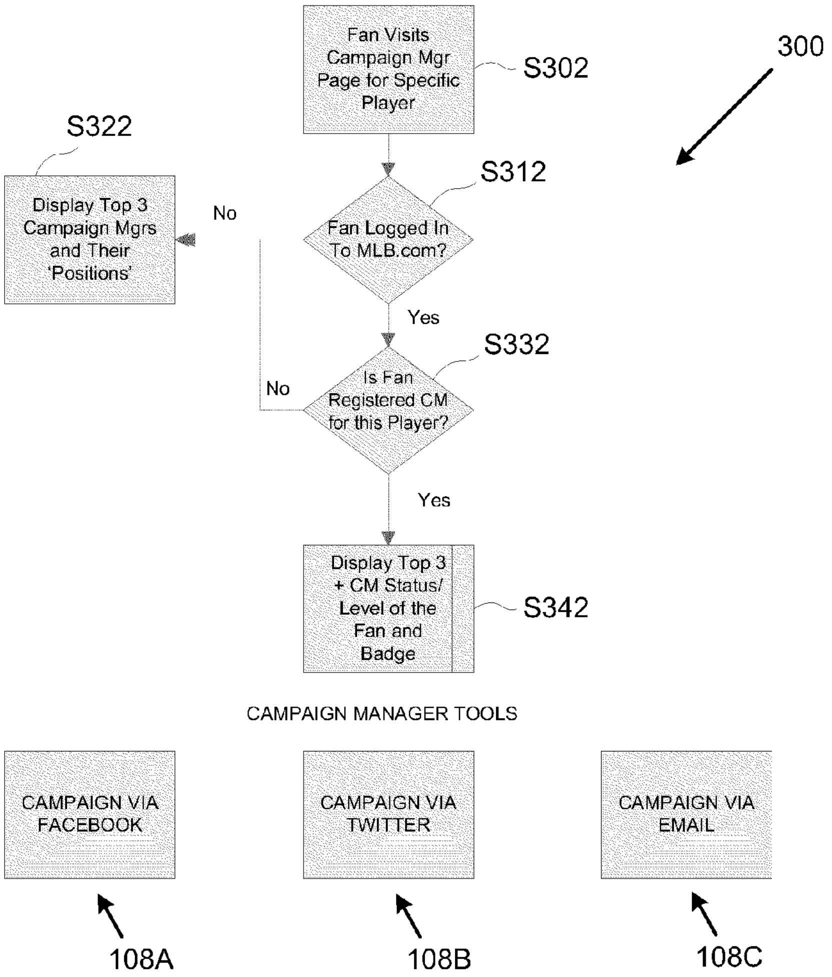
FIG. 3 is a flowchart illustrating a campaign managing process according to an embodiment of the present invention.
Figure 4:
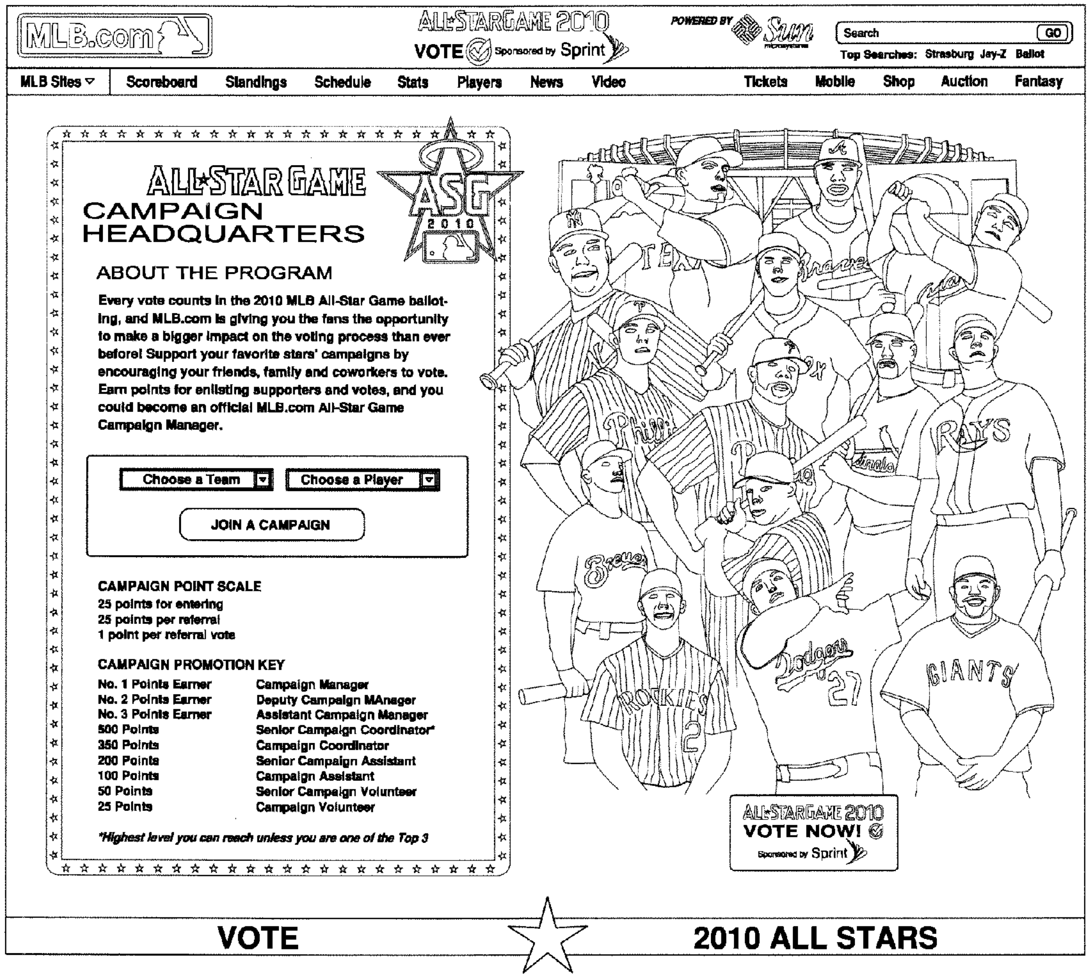
FIG. 4 is an exemplary screenshot of an interface allowing a user to join a campaign for a particular candidate player for the MLB All-Star game according to an embodiment of the present invention.
Figure 7:
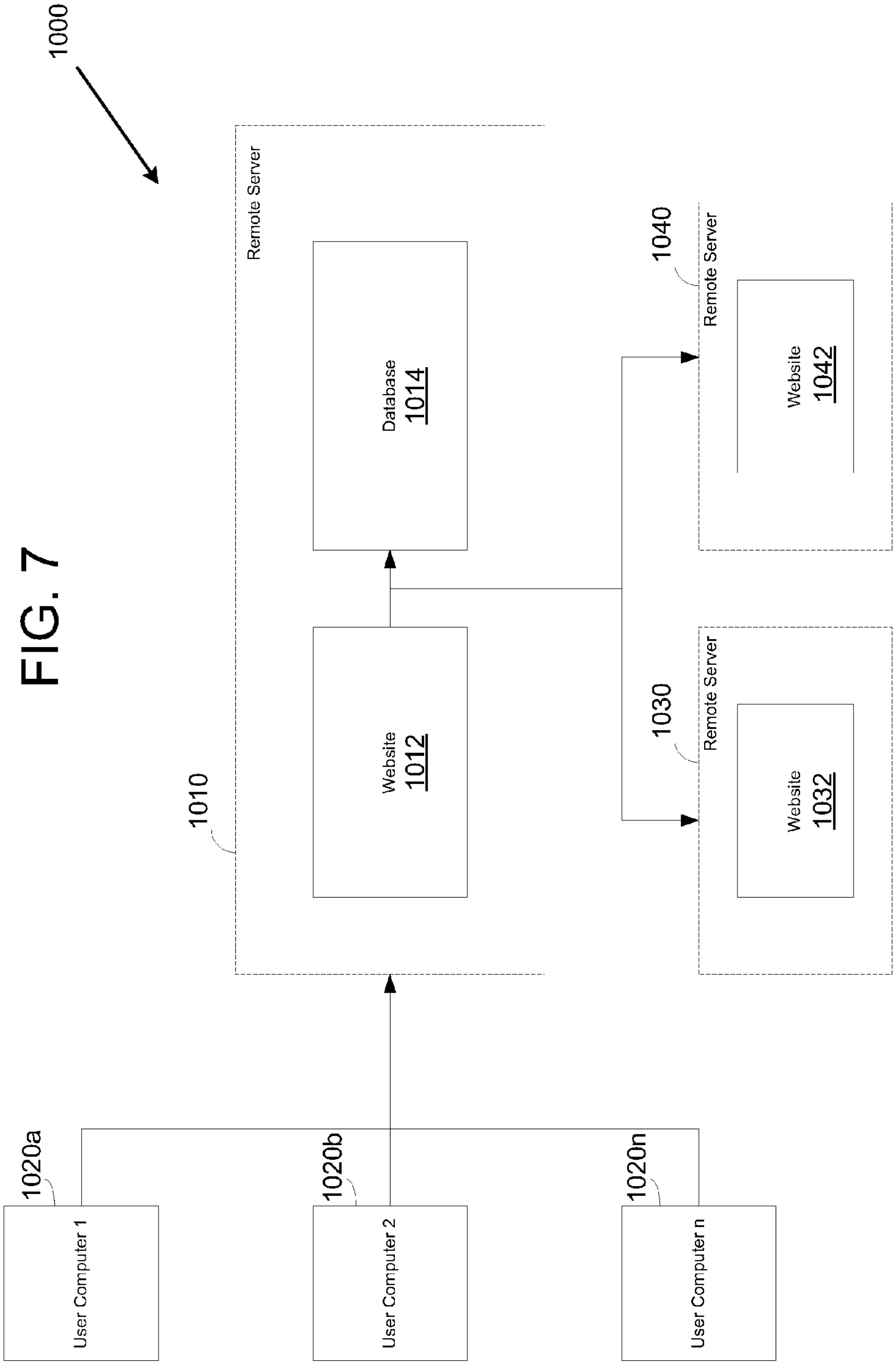
FIG. 7 is generalized representation of a voting system according to an embodiment of the present invention.

FIG. 1 is a flowchart illustrating a voting and campaigning process S100 according to an embodiment of the present invention. FIG. 2 is a flowchart illustrating a campaign referring and scoring process S200 according to an embodiment of the present invention. FIG. 3 is a flowchart illustrating a campaign managing process S300 according to an embodiment of the present invention. FIG. 7 illustrates a computing system 1000 for executing some or all of the processes S100, S200, and S300 (FIGS. 1-3) according to an embodiment of the present invention.

With reference to FIGS. 1-3 and 7, first in step S102, a (first) user at a user computer (e.g., 1020*a* in FIG. 7) may visit the MLB All-Star Ballot Registration website page 1012 (or other appropriate website) whereupon the website page 1012 is presented to the user (e.g., displayed on a display device associated with the user computer). Then in step S104, the user may be presented with a first ballot page. For instance, the first ballot page may allow the user to vote for one or more players to be elected to the American League All-Star Team. Then in S106, the user may be presented with a second ballot page. For instance, the second ballot page may allow the user to vote for one or more players to be elected to the National League All-Star Team. In other embodiments, the user may be presented with additional or fewer ballot pages as needed. For instance, the user may be presented with a single page for voting on both the American League All-Star Team and the National League All-Star Team.

Upon entering data (e.g., player votes) in both of the ballot pages, in step S112, the user may submit the data to the remote server 1010 (S108). Accordingly, in step S112, the remote server 1010 may store the data in a database 1014 associated with the remote server 1010. Accordingly, tables or other data entries may be updated in the database 1014 based on the data submitted by the user. In some embodiments, the data may be submitted to the database 1024 after completion of each ballot. In other embodiments, the data may be submitted after completion of one or more ballots (e.g., the American League ballot and the National League ballot).

After the data is submitted by the user, in step S114, the user may be presented with an other webpage (e.g., 105 in FIG. 8), for example a "Thank You for Voting" webpage, returned to the All-Star Ballot Registration webpage, and/or the like. In some embodiments, step S114 may be performed substantially simultaneously with the submittal (S108) of the data to the server 1010 and/or the storing (and/or updating) of the data in the database 1014 in S112. In other embodiments, step 114 may occur before the storing (and/or updating) of the data in the database 1014 in S112.

Figure 8:
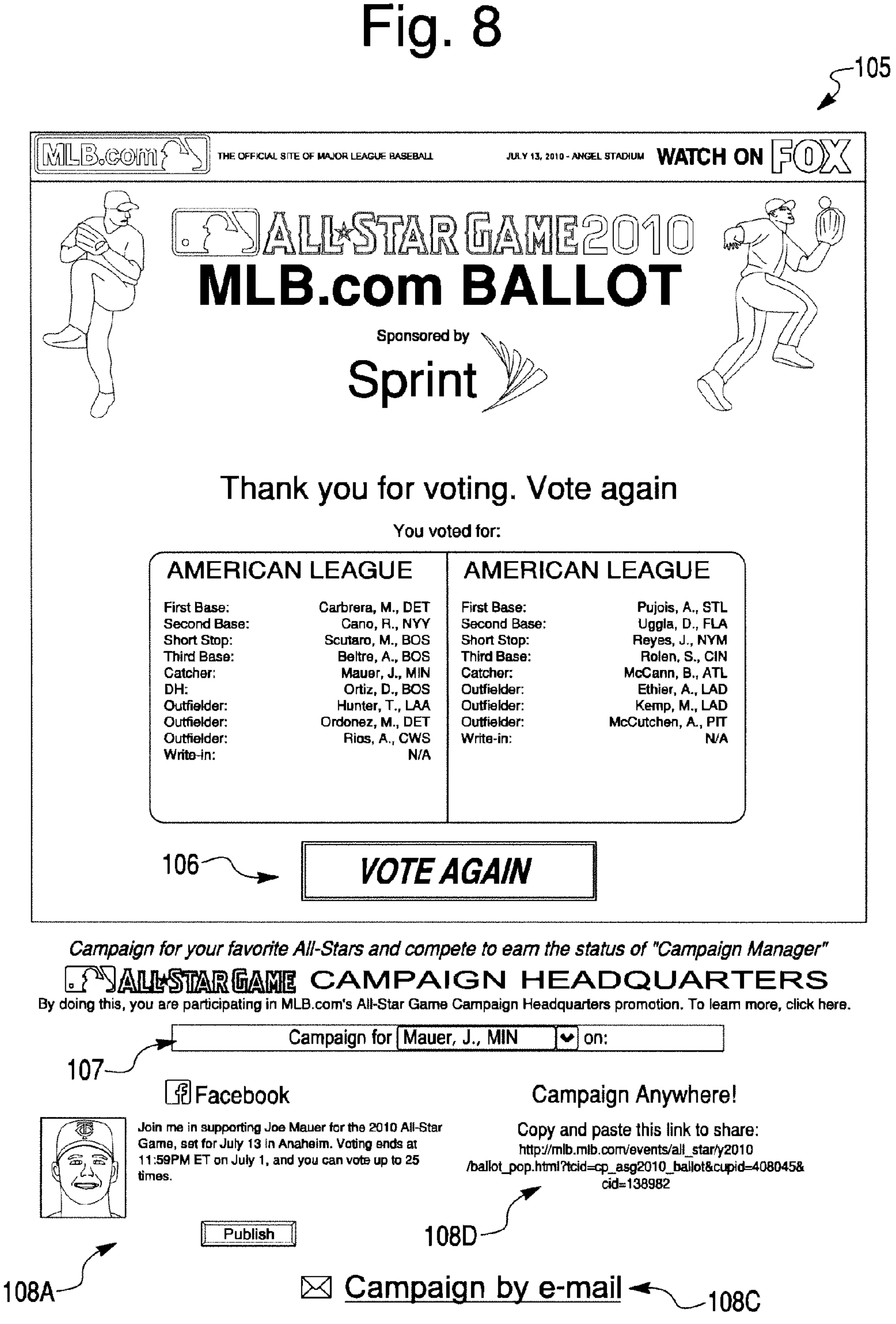
FIG. 8 is an exemplary screenshot of an interface providing various options to a voter following a vote submission by the voter according to an embodiment of the present invention.

The other page 105 may allow the user to vote again (e.g., 106 in FIG. 8) (which may return the user, for example, to step S104) and/or to campaign for a particular player (S122; 107 in FIG. 8). For instance, the user may select to campaign for Joe Mauer by selecting Joe Mauer from a list of players (e.g., corresponding to players voted upon by the user).

Then, the user may select from a plurality of methods for campaigning for the players. For instance, the user may select to campaign for Joe Mauer through Facebook (step S132; 108A in FIG. 8). Accordingly, in step S134 the system 1000 may determine (or cause determination of) whether the user is logged into Facebook, for example, by checking for cookies or the like stored on the user computer 1020*a*. If the user is not logged into Facebook or does not have an account with Facebook (S134: No), the user may be presented (by the server 1010 or a Facebook server 1030) with a Facebook webpage for allowing the user to sign into Facebook or signup for a Facebook account (step S136). If the user is logged into Facebook (S134: Yes or after S136) or the user has signed up for a Facebook account (in S136), the user may be presented with an additional Facebook webpage for allowing the user to submit campaign information to his or her Facebook profile (step S138). Steps 136 and 138, for example, may be executed upon the remote server 1010 communicating with a server 1030 associated with the Facebook website 1032.

In addition or in the alternative, the user may select to campaign for Joe Mauer through Twitter (step S142). Accordingly, in step S144 the system 1000 may determine (or cause determination of) whether the user is logged into Twitter, for example, by checking for cookies or the like stored on the user computer 1020*a*. If the user is not logged into Twitter or does not have an account with Twitter (S144: No), the user may be presented with a Twitter webpage for allowing the user to sign into Twitter or signup for a Twitter account (step S146). If the user is logged into Twitter (S144: Yes or after S146) or the user has signed up for a Twitter account (S146), the user may be presented with an additional Twitter webpage for allowing the user to submit campaign information to his or her Twitter profile (step S148). Steps 146 and 148, for example, may be executed upon the remote server 1010 communicating with a server 1040 associated with the Twitter website 1042.

In addition or in the alternative, the user may select to campaign for Joe Mauer through email (e.g., 108C in FIG. 8). For instance, the user could be provided with a link (e.g., 108D in FIG. 8) that can be pasted in an email (for sending to another user), or the system 1000 could present a form to the user for sending the campaign information to another user, and/or the like.

Thus in various embodiments, the system 1000 may allow the user to campaign for one or more players via Facebook, Twitter, email, SMS, or the like. In other embodiments, the system 1000 may allow the user to campaign for one or more players via any suitable internet system, such as (but not limited to) a Social networking site (e.g., Facebook, Twitter, Myspace, Google Buzz, LinkedIn, and/or the like), a webpage (e.g., pasting a link (108D in FIG. 8) for voting for a player, providing a "widget" or plug-in that can be incorporated into the webpage page), a blog, RSS feed, an instant messaging system (e.g., Google Chat, American Online Instant Messenger, Facebook chat, and/or the like), and/or the like.

As discussed, FIG. 2 is a flowchart illustrating the campaign referring and scoring process S200 according to an embodiment of the present invention. With reference to FIGS. 1, 2, and 7, this process S200 may be executed by the system 1000 (e.g., remote server 1010), for instance, when a second user (relative to the user described above) at a second computer (1020*b*) votes for players (similar to steps S102-S106 in FIG. 1) for the All-Star Game in response to a campaign referral from an other user (e.g., the first user) (step S201). The process continues with steps S202-S204, which may be similar to steps S102-S106. Likewise, in step S208, the second user may submit data to the remote server 1010 in a manner similar to step S108 whereupon the data may be stored in the database 1014 (and/or update the data in the database 1014) (step S212 and S112). Then in step S214, the system 1000 may present the second user with an other webpage in a manner similar to step S114 at which point the second user has an opportunity to participate in his or her own campaign(s) for one or more players, for instance, as described with respect to steps S122-S148.

Returning to step S212, in addition to storing the data of the second user to the database 1014 of the remote server 1010, the remote server 1010 may be further configured to update database entries of the first user in the database 1014 (or other database) and/or database entries of the one or more players, upon which the second user voted, in the database 1014 (or other database).

For instance, in some embodiments, in step S232, the remote server 1010 may determine if a user (e.g., the first user) or "campaign manager" referred the second user. If this was not the case (S232: No), the second user's ballot may be treated as a standard ballot (e.g., a ballot cast according to S100). If the system 1000 (e.g., the remote server 1010) determines that the second user was referred (S232: Yes), the system 1000 determines the campaign manager that referred the second user and the player for whom the campaign manager was campaigning (e.g., Joe Mauer). Accordingly, in step S244, the server 1010 may update the respective database entries of the campaign manager and the player for whom the campaign manager was campaigning based on the second user's ballot. In addition, the server 1010 may update (or create) the database entry of the second user (or second "campaign manager") based on the second user's ballot.

Then, in step S252, the server 1010 may analyze the data for one or more of the campaign managers and/or the one or more players voted upon by the second user. In particular embodiments, the server 1010 may score or rank each of the campaign managers and the one or more players voted upon by the second user. For instance, each vote for a player may cause the system 1000 to increase a voting total for the player by a particular value (e.g., 1). As another example, actions facilitated by a campaign manager may cause the system to increase a campaign total for the campaign manager by particular value. As one (non-limiting) example, a campaign manager may be awarded 25 points just for joining a campaign, 25 points for every person (e.g., the second user) you get to vote for that player, 1 pt for each vote the campaign manager makes (e.g., by re-voting) or help generates for that player (e.g., votes cast by referred voters, such as the second user, and/or votes cast by other voters, such as voters referred by any referred voters).

The campaign manager may receive various rankings, prizes, rewards, and/or the like based on the campaign total of the campaign manager. For example, the No. 1 points earner may receive a rank (or position) of: Campaign Manager; No. 2 points earner: Deputy Campaign Manager; No. 3 points earner: Assistant Campaign Manager; and/or 500 points: Senior Campaign Coordinator; 350 points: Campaign Coordinator; 200 points: Senior Campaign Assistant; 100 points: Campaign Assistant; 50 points: Senior Campaign Volunteer; 25 points: Campaign Volunteer.

In step S254, the remote server 1010 may update the appropriate database(s) 1014 with the scores calculated in step S252. Then in step S262, the remote server 1010 may generate the scoring leaders (e.g., the campaign managers with the highest campaign totals) based on the updated scores of step S254.

Figure 6:
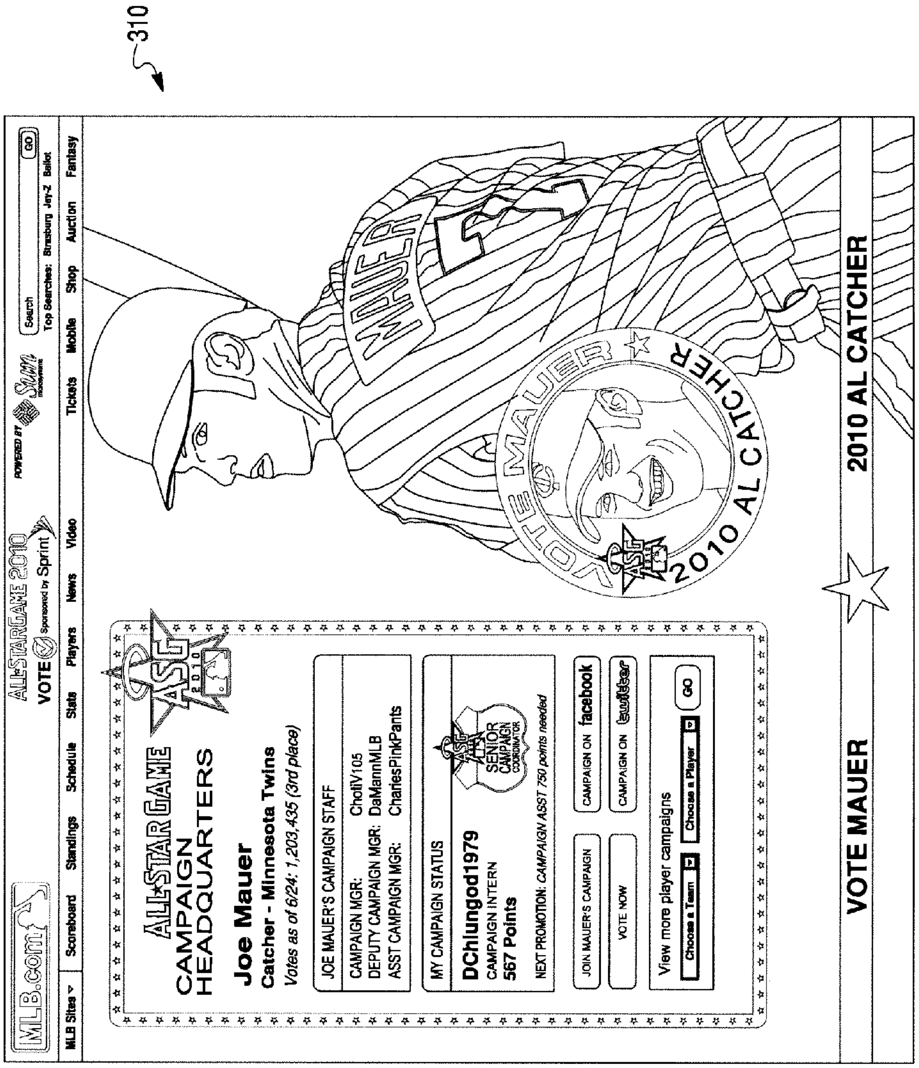
FIG. 6 is an exemplary screen shot of a campaign for a particular player candidate according to an embodiment of the present invention.

As discussed, FIG. 3 is a flowchart illustrating a campaign managing process according to an embodiment of the present invention. In addition to the steps described above, a fan (e.g., the second user or other user) may visit a campaign page for a specific player (step S302), for example, as shown in FIG. 6. The fan may visit this campaign page through a plurality of manners, for instance (but not limited to), navigating the MLB.com website (or other associated site), using a link or other referral provided by another fan (or campaign manager), for example as previously discussed, and/or the like.

With reference to FIGS. 3 and 7, then in S312, the server 1010 may determine whether the fan is logged into the website (e.g., MLB.com), for instance, in a manner similar to checking whether a user is logged into Facebook (S134 in FIG. 1) or Twitter (S144 in FIG. 1). If the fan is not logged in (or not registered) (S312: No), the server 1010 may display to the fan certain information (step S322), such as (but not limited to) the identities (or profile names) of the top three campaign managers for that particular player, their respective positions, and/or the like. An example of this is shown in FIG. 6. Such a page may allow the fan to vote for the particular player (e.g., Joe Mauer), become a campaign manager for the particular player, view other players and/or campaigns, and/or the like.

Returning to FIGS. 3 and 7, if the fan is logged in (S312: Yes), the server 1010 may determine whether the fan is already a campaign manager for that particular player. If not (S332: No), the server 1010 may display to the fan certain information (e.g., step S322; FIG. 6). If the fan is a campaign manager for the particular player (S332: Yes), in step S342, the server 1010 may display a screen, shown as that shown in FIG. 6. Such a screen may display similar information to other screens (e.g., screen displayed for S312: No; screen displayed for S322). The screen may include (optionally or alternatively) other information or data such as the fan campaign status. As shown in FIG. 6, the fan ("DCiungod1979") has obtained 567 campaign points for the player Joe Mauer and obtained the rank of "Senior Campaign Coordinator."

Figure 5:
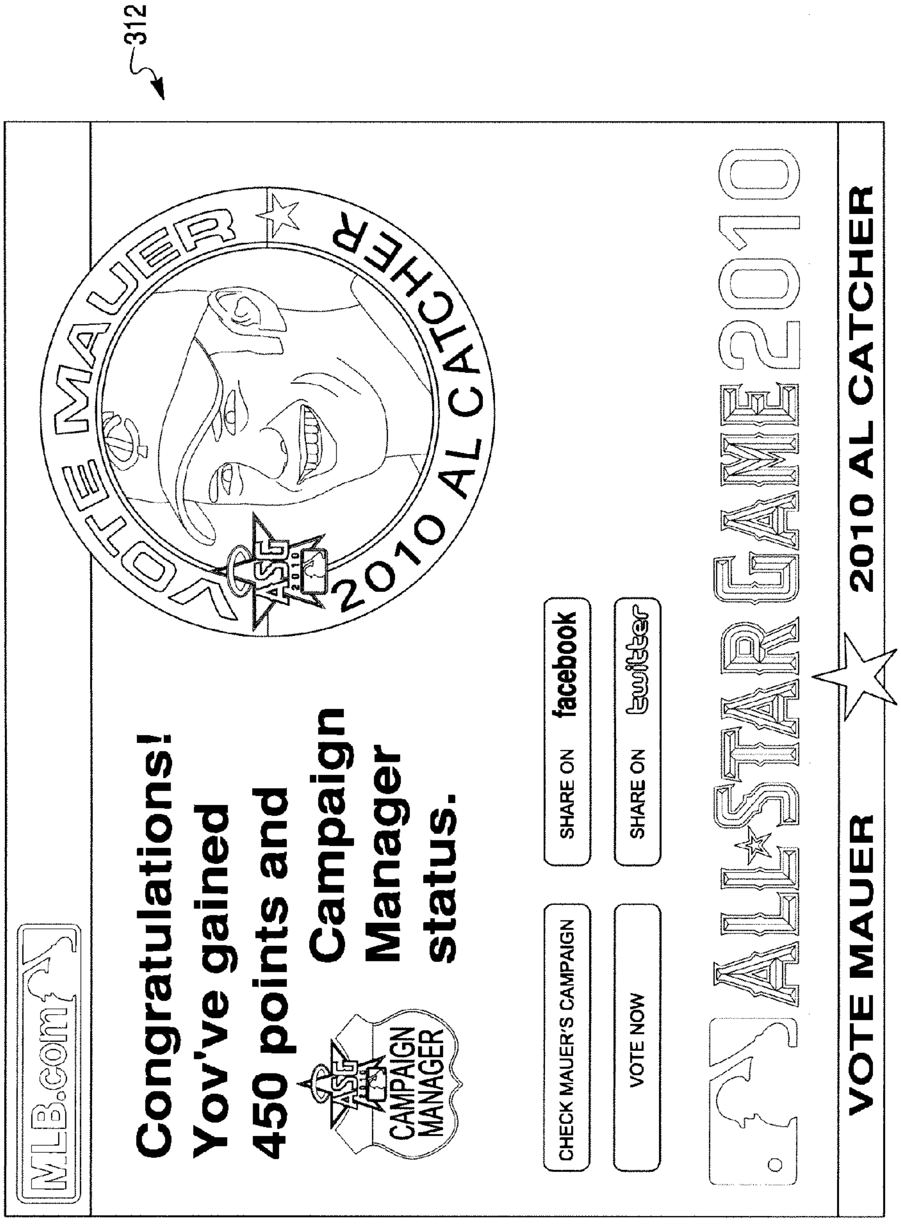
FIG. 5 is an exemplary screenshot of a status of a user's campaign according to an embodiment of the present invention.

With reference to FIGS. 1-3 and 7, in various embodiments, the campaign managers (e.g., the first user) can check on the status of his or her campaign. For instance, the campaign manager may visit the MLB website (e.g., 1012 in FIG. 7) (or other associated website, such as a widget on a Facebook page or Google page) to see the updated scores as produced in step S254. Or for instance, the system 1000 may email (e.g., FIG. 5), tweet, text, or otherwise send a communication to the campaign manager notifying the campaign manager of any changes and/or his or her campaign status.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A method for operating a campaigning system on a computer system having a server and at least one computer, the method comprising:

collecting simulated vote totals of candidates in simulated campaigns for a plurality of users;

tracking, by the server or the at least one computer, performances of the simulated campaigns of each of the plurality of users relative to one of 1) performances of the simulated campaigns of the other users and 2) one or more predefined totals;

maintaining a campaign database in the server for the vote totals of the candidates of the simulated campaigns and current data associated with the simulated campaigns for each of the plurality of users;

receiving a request for a campaign screen from a requesting user of the plurality of users;

generating the campaign screen based on the campaign database of the server for display on a computer of the requesting user, the campaign screen for displaying the current data for the simulated campaign of the requesting user, the campaign screen for providing a link associated with the requesting user, the link for allowing one or more voters to vote for the candidate associated with the simulated campaign of the requesting user;

providing an interface associated with the link, the interface for enabling the one or more voters to submit a vote for the candidate associated with the simulated campaign of the requesting user to update the current data for the simulated campaign of the requesting user in the campaign database of the server;

updating the current data for the simulated campaign of the requesting user in the campaign database of the server based on the vote submitted by the voter;

updating the vote total for the candidate associated with the simulated campaign of the requesting user in the campaign database of the server based on the vote submitted by the voter; and generating, for display on the computer of the requesting user, i) performance of the simulated campaign of the requesting user based on the updated current data and ii) the updated vote total for the candidate associated with the simulated campaign of the requesting user.

2. The method of claim 1, the method further comprising:

transmitting the link to the one or more voters to allow the one or voters to submit a vote for the candidate associated with the simulated campaign of the requesting user.

3. The method of claim 2, wherein transmitting comprises transmitting via email.

4. The method of claim 2, wherein transmitting comprises transmitting via SMS.

5. The method of claim 2, wherein transmitting comprises transmitting via a social media network.

6. The method of claim 1, wherein at least some of the one or more voters comprise at least some of the plurality of users.

7. The method of claim 1, the method further comprising:

assigning a score to each of the plurality of users based on their tracked performances.

8. The method of claim 7, ranking each of the plurality of users based on the score of each of the users; and generating, based on the ranked scores, at least a partial list that includes at least two of the plurality of users for display on the computer of the requesting user.

9. The method of claim 1, the method further comprising:

receiving a vote, from the one or more voters, for the candidate associated with the simulated campaign of the requesting user to update the current data for the simulated campaign of the requesting user in the campaign database of the server.

10. The method of claim 1, wherein the interface is displayed on a display device of the one or more voters.

11. The method of claim 1, wherein at least two of the plurality of users campaign for one of the candidates.

12. The method of claim 11, wherein tracking comprises:

tracking, by the server or the at least one computer, performances of the simulated campaigns of each of the at least two of the plurality of users relative to the performances of the simulated campaigns of the other of the at least two of the plurality of users.

13. The method of claim 1, wherein the candidates are individuals.

14. The method of claim 1, the method further comprising:

receiving a request from the voter to begin a simulated campaign for the candidate associated with the vote of the voter.

15. The method of claim 14, the method further comprising:

updating the campaign database based on the request.

16. The method of claim 1, wherein the current data of the simulated campaign corresponds to the performance of the simulated campaign.

17. The method of claim 1, wherein the performance of the simulated campaign of the requesting user and current vote total for the candidate associated with the simulated campaign of the requesting user are generated for display on a same screen on the computer of the requesting user.

18. The method of claim 1, wherein the performance of the simulated campaign of the requesting user and current vote total for the candidate associated with the simulated campaign of the requesting user are generated for display on different screens of the computer of the requesting user.

* * * * *